Figure 1:
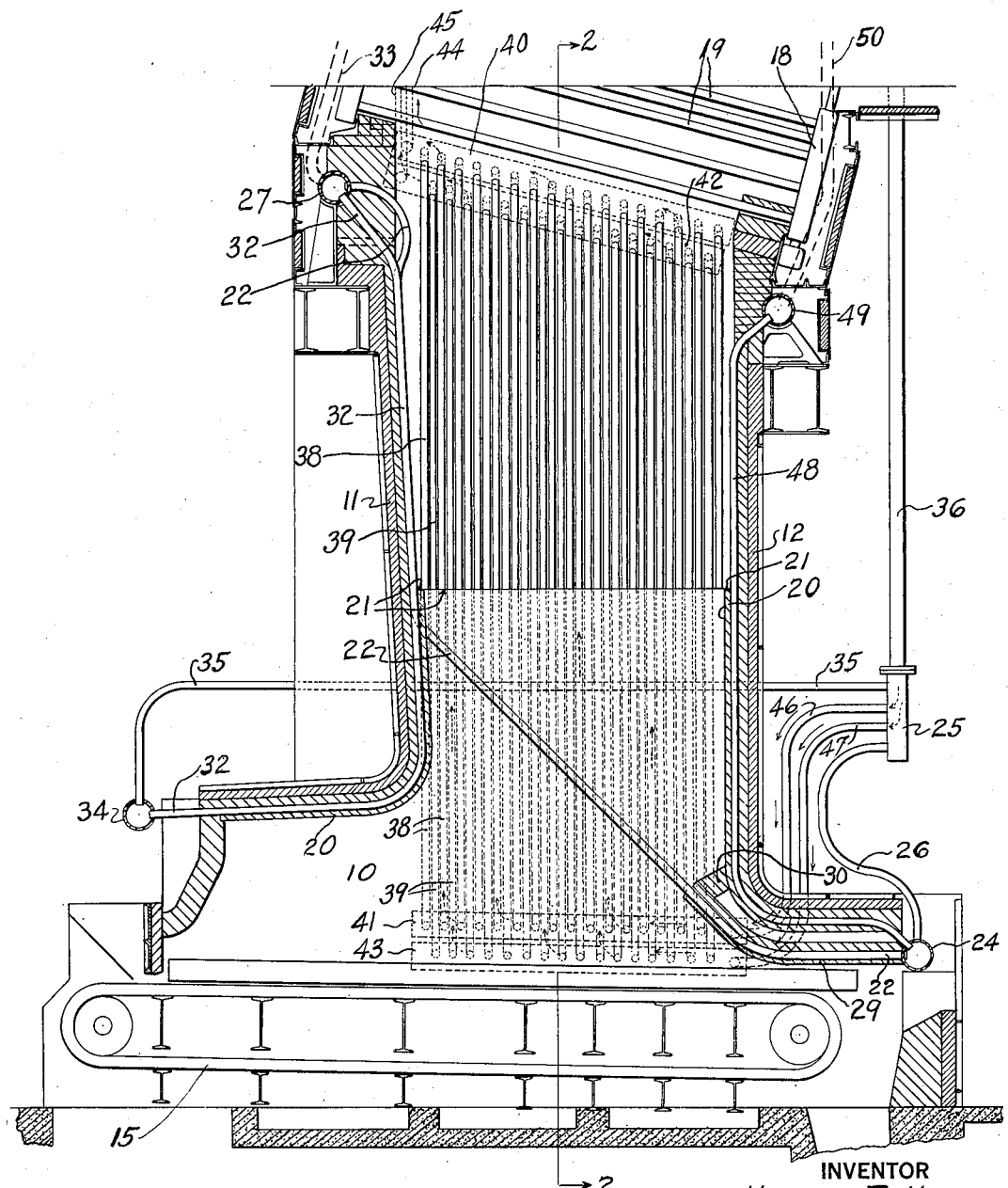

April 29, 1930.　　　H. J. KERR　　　1,756,755
FURNACE
Filed Sept. 24, 1926　　　3 Sheets-Sheet 1

INVENTOR
HOWARD J. KERR
BY
Gifford and Scull
ATTORNEYS

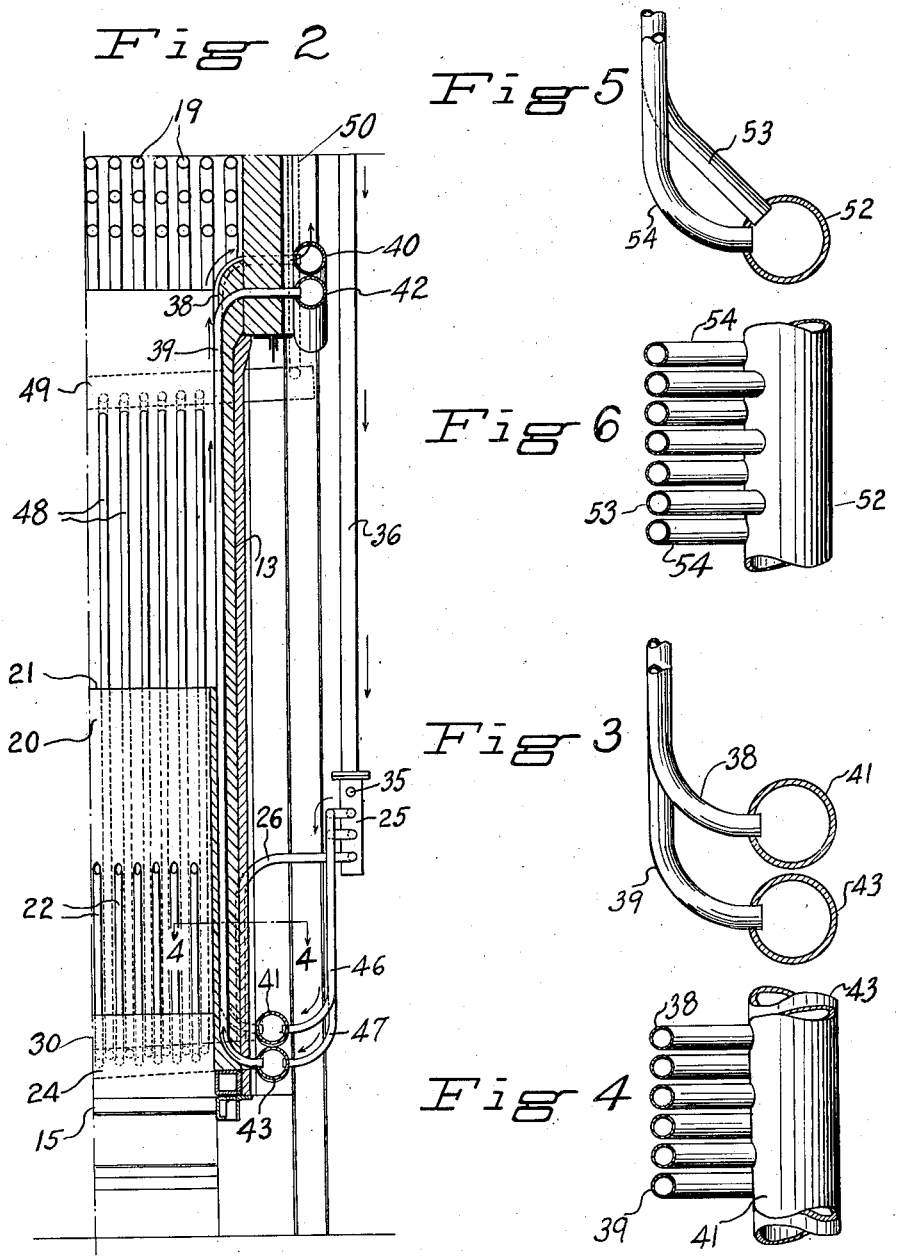

April 29, 1930.  H. J. KERR  1,756,755
FURNACE
Filed Sept. 24, 1926   3 Sheets-Sheet 3
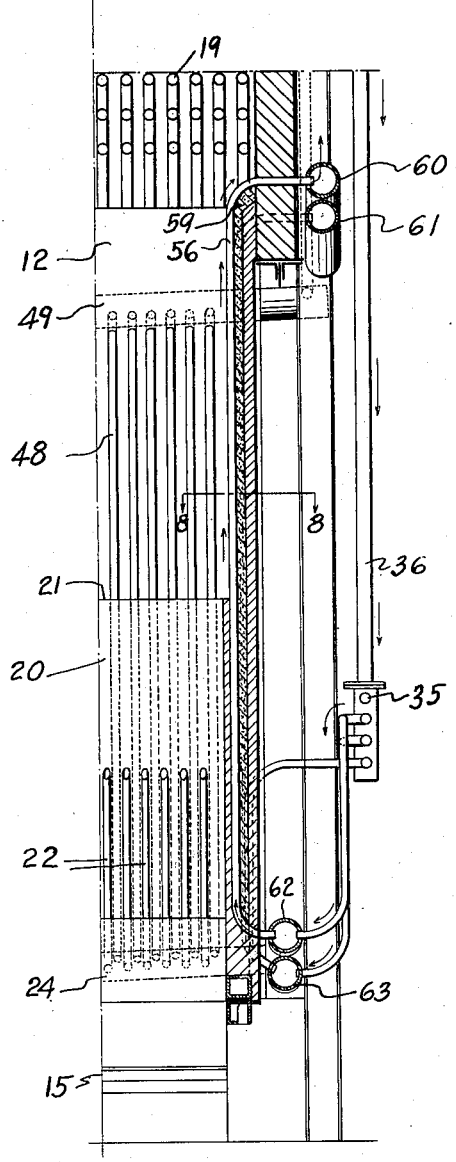
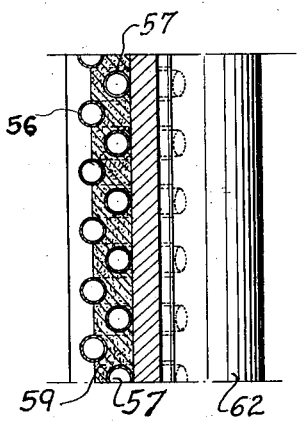
INVENTOR
HOWARD J. KERR
BY
Gifford and Scull
ATTORNEYS Patented Apr. 29, 1930

1,756,755

UNITED STATES PATENT OFFICE

HOWARD J. KERR, OF WESTFIELD, NEW JERSEY, ASSIGNOR, BY MESNE ASSIGNMENTS, TO FULLER LEHIGH COMPANY, A CORPORATION OF DELAWARE

FURNACE

Application filed September 24, 1926. Serial No. 137,409.

This invention relates to a system or means for cooling the walls of a furnace and to means for the protection of the furnace walls by water tubes connected so that they may be brought into contact with or closely adjacent to one another, to more readily absorb the heat from the furnace and more thoroughly protect the refractory wall.

My invention will be best understood from the following description and the annexed drawings of an illustrative embodiment thereof in which Fig. 1 is a cross-section taken through the furnace from the front to the rear; Fig. 2 is a cross-section on the line 2—2 of Fig. 1; Fig. 3 is a cross-section taken through the bottom headers of the side wall showing the detail of these enlarged over that of Fig. 2; Fig. 4 is a cross-section in plan on the line 4—4 of Fig. 2; Fig. 5 is a cross-section similar to that of Fig. 3 showing a modification; Fig. 6 is a cross-section in plan of Fig. 5; Fig. 7 is a cross-section through the side wall of the furnace showing a modified wall and insulation means, and Fig. 8 is a cross-section in plan of the lower headers taken on the line 8—8 of Fig. 7.

Like reference characters indicate like parts in the several views.

In the illustrative embodiments of this invention, the furnace chamber 10 is enclosed by front wall 11, back wall 12 and side walls 13. The fuel-feeding means 15, shown as a chain grate stoker, feeds the fuel from a hopper at the front of the furnace and discharges into an ashpit at the rear of the furnace chamber. A boiler 18, of the water tube type, is supported above the furnace and its tubes 19 cross the upper portion of the furnace chamber 10 in the path of the hot gases flowing therefrom.

I have provided the furnace chamber 10 with an inner refractory lining 20 extending above the grate and terminating in an upper ledge 21. This lining protects the wall cooling tubes in the hottest portion of the furnace chamber from contact with the hot flames immediately above the bed of the fire and from accumulations of slag.

The furnace is provided with a slag screen comprising a row of tubes 22 extending diagonally across the furnace chamber and connected with the boiler system through header 24 outside the lower part of the back wall 12. This header 24 is connected preferably at each end to a distributor header 25 by a connecting tube 26. These tubes 22 enter the front wall 11 below the ledge 21 and follow the interior line of the front wall till near the top of the furnace chamber, when they pass through the wall 11 and enter header 27. The tubes 22 and the header 24 are protected in part near the chain grate stoker by a refractory lining 29. This lining extends through a portion of the rise of the slag screen tubes and entirely covers them through this distance forming an arch over the rear of the stoker. A wall 30 joins and fills the space between the refractory lining 29 and the lining 20 of the furnace chamber.

The wall cooling tubes are connected in with the boiler circulatory system and arranged to cool and in some places to shield the walls of the furnace chamber. These wall cooling tubes are embedded in the wall below the ledge 21 and directly exposed above the ledge to the full heat of the furnace chamber.

The front wall is protected by a row of tubes 32 connected at their upper ends to header 27 and at their lower ends to header 34, the lower portion being bent to follow the curve of the arch over the inlet end of the stoker. Tubes 32 are spaced apart so that the upper ends of tubes 22 lie between them; that is, tubes 22 and 32 alternate across the wall with adjacent tubes closely spaced, either touching each other or with a small space between them. Both sets of tubes enter header 27, the upper ends of tubes 22 being bent so that they enter header 27 on a line higher than the line of the ends of tubes 32, so as not to cut the header 27 by the closeness of the tube holes in the header.

Header 27 is connected, preferably at each end, by tube 33 with the boiler circulation. Header 34 is connected, preferably at each end, by tube 35, to a distributor header 25, which in turn, is connected by pipe 36 with the boiler circulation.

Each furnace side wall has two sets of tubes 38 and 39, lying side by side and alternating across the wall, tubes 38 being connected to upper header 40 and lower header 41, and tubes 39 being connected to upper header 42 and lower header 43. The lower headers are substantially horizontal and parallel, and the upper headers are inclined to the horizontal. The upper ends of upper headers 40, 42 are connected to the boiler circulation by tubes 44, 45, respectively, and the lower headers 41 and 43 are connected to distributor header 25 by tubes 46 and 47, respectively. As shown best in Fig. 2, the upper and lower side wall headers are outside the furnace wall, the ends of the tubes being bent to pass through the side wall into the headers. The lower portion of the tubes 38, 39 are covered with the refractory lining up to ledge 21. The tube connections to the lower headers are shown on a larger scale in Figs. 3 and 4.

The use of two sets of headers and two groups of wall cooling tubes, as is illustrated in the side wall construction, enables the close spacing of the cooling tubes. Thus the wall of the furnace chamber may be completely covered and protected by boiler tubes connected into headers without impairing the ligament value or tensile strength of any one header.

The rear wall 12 of the furnace is provided with cooling tubes 48 and has the same protective lining 20 extending above the grate between the tubes and the fire. The tubes connect into the lower header 24 exteriorly of the wall 12 and discharge into header 49 exteriorly of the top of the furnace wall. The header 49 is also connected, preferably at each end, by tube 50 to the boiler circulation. Tubes 48 are exposed above the ledge 21 similarly to the previous constructions and protect the wall from the furnace heat. In the form shown, the tubes 48 are relatively widely spaced and are connected to a single header at the top and bottom, but it will be understood that two sets of tubes and two sets of headers may be used to get a close spacing of the tubes, if desired. Further, it is easily seen that all the arrangements are merely illustrative and no one of these arrangements is limited to any particular wall.

Figs. 5 and 6 show in a large scale detail, a single header tube 52 used in place of the two shown in Figs. 3 and 4. The tubes 53 and 54 are brought into this header at different angles so as to be alternately positioned, radially spaced, in two groups on the surface of the tube. This radial and longitudinal staggering of the tube connections maintains the close tube spacing without a material injury to the strength of the header. This is made possible in the staggering of the tubes by providing a sufficient cross-sectional area between the perforations, so that the ligament value or tensile strength of the header is not excessively impaired.

I show in Figs. 7 and 8 such an arrangement of cooling tubes as will provide for the use of a plastic refractory lining. These tubes are staggered relatively to the wall, one set of the tubes 56 being nearer the furnace gases, and the other set of tubes 57 being positioned backwardly of the first set and contacting a wall 58.

A plastic lining of refractory material 59 is easily applied and retained in place by and between the tubes when positioned as shown. The tubes are protected at the lower portion of the wall by the furnace lining 20 as previously shown. Tubes 56 connect into headers 60 and 62 and the tubes 57 connect into headers 61 and 63 in a manner like that shown in Figs. 3 and 4. This modification permits the use of an even thinner wall than that in the structures earlier described.

It will be understood that in the details of Figs. 3 to 6 and Fig. 8, the tubes may be placed tangent to one another to form a continuous, water cooled wall. It will be obvious that various other modifications are possible in addition to those shown in these embodiments of my invention.

I claim:

1. A furnace chamber having a fuel feeding device in its lower part, a wall of said chamber having parallel, substantially vertical wall cooling tubes extending along the wall and spaced relatively widely apart, upper and lower headers connected respectively to the upper and the lower ends of said tubes, a row of slag screen tubes extending across the furnace chamber with their upper ends extending along said wall between said wall cooling tubes, and connections to supply a cooling fluid to said slag screen tubes and said wall cooling tubes.

2. A furnace chamber having a fuel feeding device in its lower part, a wall of said chamber having parallel, substantially vertical wall cooling tubes extending along the wall and spaced relatively widely apart, upper and lower headers connected respectively to the upper and the lower ends of said tubes, a row of slag screen tubes extending across the furnace chamber with their upper ends extending along said wall between said wall cooling tubes and with each slag screen tube substantially in contact with the adjacent cooling tubes, and connections to supply a cooling fluid to said slag screen tubes and said wall cooling tubes.

3. A furnace chamber having a fuel feeding device in its lower part, a wall of said chamber having parallel, substantially vertical wall cooling tubes extending along the wall and spaced relatively widely apart, upper and lower headers connected respectively to the upper and the lower ends of said tubes, a row of slag screen tubes extending across the furnace chamber with their upper ends extending along said wall between said wall cooling tubes, and connections to supply a cooling fluid to said slag screen tubes and said wall cooling tubes, said slag screen tubes being connected at their upper ends to said upper header through a row of holes out of alinement with the row of holes through which said cooling tubes are connected to said upper header.

4. A furnace chamber having a fuel feeding device in its lower part, a wall of said chamber having parallel, substantially vertical wall cooling tubes extending along the wall and spaced relatively widely apart, upper and lower headers connected respectively to the upper and the lower ends of said tubes, a row of slag screen tubes extending across the furnace chamber with their upper ends extending along said wall between said wall cooling tubes, and connections to supply a cooling fluid to said slag screen tubes and said wall cooling tubes, the lower ends of said slag screen tubes being covered with a refractory to form an arch.

HOWARD J. KERR.